United States Patent [19]
Kim

[11] Patent Number: 6,058,242
[45] Date of Patent: *May 2, 2000

[54] APPARATUS FOR PERFORMING PROGRAMMED RECORDING USING BROADCAST PROGRAM DATA AND METHOD THEREFOR IN A TWO-TUNER SYSTEM

[75] Inventor: Sung-doug Kim, Suwon, Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/901,240

[22] Filed: Jul. 25, 1997

[30] Foreign Application Priority Data

Jul. 30, 1996 [KR] Rep. of Korea ...................... 96-31551

[51] Int. Cl.[7] ..................................... H04N 5/91
[52] U.S. Cl. ............................. 386/83; 348/569; 348/906
[58] Field of Search .................................. 386/1, 46, 83; 348/5, 731, 732, 733, 734, 906, 705, 706, 563, 569

[56] References Cited

U.S. PATENT DOCUMENTS 5,550,576  8/1996  Klosterman .................. 348/6
5,631,995  5/1997  Weissensteiner et al. .................. 386/1

*Primary Examiner*—Wendy Garber
*Assistant Examiner*—Christopher Onuaku
*Attorney, Agent, or Firm*—Dilworth & Barrese

[57] ABSTRACT

An apparatus for performing programmed recording using broadcast program (BP) data in a two tuner system and a method therefor. The apparatus includes a switching portion which receives the output signal of a first tuner, the output signal of a second tuner, and an externally applied demodulated video signal, switches the input signals according to a switching control signal, and outputs a TV viewing signal, a BP data detecting signal, and a VCR recording signal. A BP data processor receives the BP data detecting signal, stores the BP data changed from the previously stored BP data during a BP data storing period and checks whether the BP data of the programmed recording is input during a discriminating BP data comparing period according to the BP data control signal. A TV signal processor receives, signal processes, and outputs the TV viewing signal to a monitor. A video recording processor receives the VCR recording signal and performs recording. A controller generates a switching control signal for determining multiple output signals by switching the input signals of the switching portion according to the selection of a user, a BP data control signal for defining a BP data comparing period and a BP data storing period, and a recording control signal for performing the recording only when the BP data set to be recorded is checked.

6 Claims, 3 Drawing Sheets

APPARATUS FOR PERFORMING PROGRAMMED RECORDING USING BROADCAST PROGRAM DATA AND METHOD THEREFOR IN A TWO-TUNER SYSTEM

BACKGROUND OF THE INVENTION

1. Field of the Invention

The present invention relates to an apparatus for performing programmed recording using broadcast program (BP) data and a method therefor, and more particularly, to an apparatus for performing programmed recording using BP data and a method therefor in a system having two tuners for storing the BP data of a viewed channel and performing programmed recording using the BP data. The present invention is based on Korean Application No. 96-31551, which is incorporated herein by reference.

2. Description of the Related Arts

A general broadcast system for transmitting a broadcast signal including broadcasting program data transmits digital encoded information of various types as well as a broadcasting signal having an audio signal and an image signal. Examples of a general broadcast system include a teletext, a video program system (VPS), a video programmed videorecorder (VPV), and the Korean broadcasting program system (KBPS), etc.

In the general data broadcast system, the power supply of a television coupled with a VCR (TVCR) is kept off and the recording is performed when the BP data corresponding to a program programmed to be recorded is determined to be input by checking the BP data input from the channel programmed to be recorded.

However, a general TVCR having one tuner suffers from a drawback when a channel is programmed to be recorded using BP data when other channels are viewed. In this case, the programmed recording cannot be performed since the BP data of the channel programmed to be recorded cannot be compared with the programmed BP data.

SUMMARY OF THE INVENTION

It is an object of the present invention to provide an apparatus for performing programmed recording using BP data and a method therefor in a two-tuner system in which it is possible to store changed BP data while watching a TV by using two tuners, and to record a program programmed to be recorded by comparing the program data of a channel programmed by a user to be recorded with the stored program data and confirming whether they correspond.

The apparatus for performing the programmed recording using the BP data in the two-tuner system includes a switching portion for receiving as input signals the output signal of the first tuner, the output signal of the second tuner, and an externally applied demodulated video signal, switching the input signals according to a switching control signal, and outputting a TV viewing signal, a BP data detecting signal, and a VCR recording signal, a BP data processor for receiving as input the BP data detecting signal, storing the BP data changed from the previously stored BP data during a BP data storing period and checking whether the BP data of the programmed recording is input during a BP data comparing period according to the BP data control signal, a TV signal processor for receiving as input the TV viewing signal, signal processing it, and outputting it to a monitor, a video recording processor for receiving as input the VCR recording signal and performing the recording, and a controller for generating a switching control signal for determining multiple output signals by switching the input signals of the switching portion according to the selection of a user, a BP data control signal for defining a BP data comparing period and a BP data storing period, and a recording control signal for performing the recording only in a state in which the BP data set to be programmed to be recorded is checked.

The method for performing the programmed recording using the BP data in the two-tuner system includes a BP data storing step of storing the BP data of all the broadcast channels which transfer BP data, when power is turned on, a BP data storing/checking step of storing the changed BP data of the broadcast signal of a received channel, changing the channel of the second tuner at a predetermined period until a predetermined time before the starting time of a program programmed to be recorded and checking the identification code of BP data of the channel programmed to be recorded after the predetermined time before the starting time of a program programmed to be recorded, when the BP data of all the respective channels is stored, and a recording step of performing the recording in the case when the input BP data is determined to be identical to the identification code of BP data programmed to be recorded, as a result of performing the BP data storing/checking step.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the attached drawings.

Figure 1:
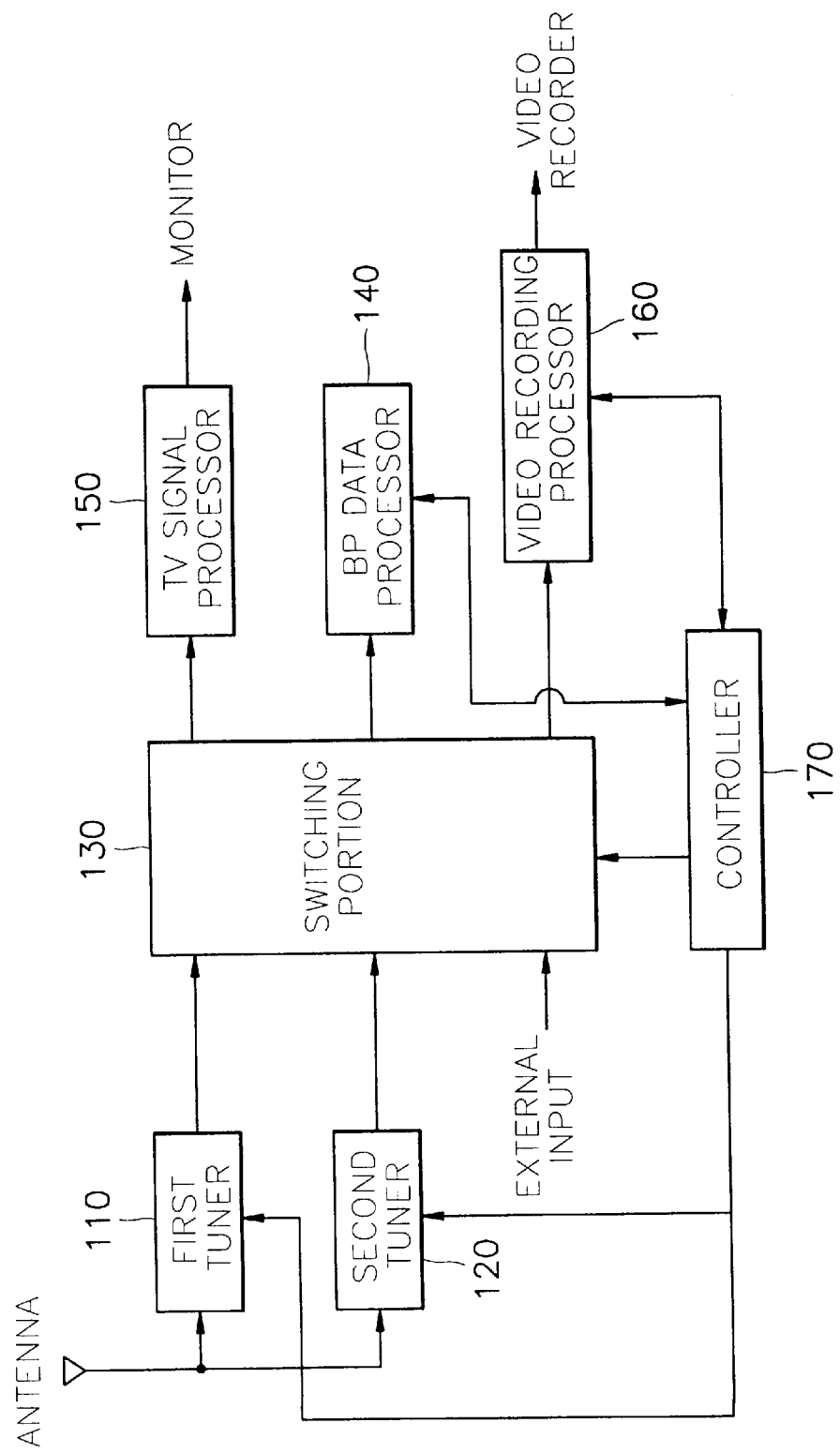
FIG. 1 shows the structure of an apparatus for performing a programmed recording using BP data in a two-tuner system according to the present invention.

FIG. 1 shows an apparatus for performing programmed recording using BP data in a two-tuner system according to the present invention. The system includes a TV receiving first tuner 110 for outputting the broadcast signal of a channel selected from all of the broadcasted channels received via an antenna and to be displayed on a TV monitor, a VCR recording second tuner 120 for outputting the broadcast signal of a channel selected from all the broadcasted channels received via the antenna and to be recorded, a switching portion 130 for selecting and outputting multiple input signals, a BP data processor 140 for storing received BP data and comparing the received BP data with the discriminating BP data of the program to be recorded, a TV signal processor 150 for performing RGB signal processing on the selected TV viewing signal and outputting the processed signal to a monitor, a video recording processor 160 for modulating the selected video recording signal and outputting the modulated signal to a video recorder to be recorded onto a recording medium, and a controller 170 for controlling the respective elements of the apparatus.

In the programmed recording method using the BP data, a broadcasting station multiplexes an intrinsic discriminating signal with the TV broadcasting signal and transfers the multiplexed signal as a broadcasting program. This is unlike a conventional programmed recording method in which the time at which a broadcast program starts and the length of the broadcasting program are input. Then, a receiver detects the transmitted discriminating signal using an appropriate decoder. When the discriminating data of the program which is programmed in advance to be recorded matches the transmitted discriminating signal, the receiver starts the programmed recording.

The first tuner 110 tunes to the broadcasting signal of a specific channel selected by a user from all the received broadcasting signals and outputs the selected channel to be displayed on the TV monitor.

A reference time is obtained by subtracting a particular time from the start time of the program programmed to be recorded. In order to update the BP data before the reference time, the second tuner 120 sequentially changes channels and outputs the broadcasting signal of each channel in order to store the BP data of all the received channels, during an initial stage in which the power begins to be supplied by a channel selecting control signal. After the reference time, the second tuner 120 outputs only the broadcast signal of the channel programmed to be recorded.

The switching portion 130 accepts as inputs the output signal of the first tuner 110, the output signal of the second tuner 120 and an external input signal, selects a TV viewing signal, a VCR recording signal, and a BP data processing signal according to a switching control signal, and outputs the selected signals.

The TV viewing signal is selected by the user from the broadcast signal of the channel output by the first tuner 110 or the external input signal. The VCR recording signal is selected by the user from the broadcast signal of the channel output by the second tuner 120 or the external input signal. The BP data processing signal is the output signal of the second tuner 120 before the reference time and becomes the signal which switches the outputs of the first tuner 110 and the second tuner 120 at a predetermined period after the reference time.

The BP data processor 140 stores new BP data which is received while being included in the input BP data processing signal and compares the new BP data with the discriminating BP data of the programmed recording.

The BP data processor 140 receives a BP data detecting signal output from the switching portion 130 and newly stores any BP data that has changed from the previously stored BP data during a BP data storing period according to the BP data control signal. When comparing the BP data by the BP data control signal, the BP data processor 140 newly stores any changed BP data of the channel the user is watching at a predetermined interval of time and checks whether the BP data programmed to be recorded is detected in the broadcast signal of the channel to be recorded.

During an initial stage after the power is supplied according to the switching control signal, the BP data processor 140 sequentially stores in a memory the BP data of all of the broadcasting channels which contain the BP data, and then updates only the changed BP data by storing the changed BP data in the memory, before the reference time.

The TV signal processor 150 performs video signal processing by receiving the TV viewing signal selected according to the switching control signal, reconstructing the TV viewing signal to the RGB signals, and outputting the reconstructed signal to the monitor.

When the BP data programmed to be recorded is received, the video recording processor 160 modulates the VCR recording signal according to the recording control signal and outputs the modulated signal to a video recorder (not shown) which includes a recording amplifier and a video head.

The controller 170 controls the above-mentioned elements. That is, the controller 170 generates and outputs a channel selection control signal for selecting the channel to be output to the TV monitor and for tuning a broadcasting signal of the channel to be recorded by the first and second tuners 110 and 120, respectively, according to the selection of the user. The channel selection control signal also controls the sequential selection of channels in order to store the BP data of all the channels after the power is turned on. The channel selection control signal does this by changing the tuned frequency of the second tuner 120 to the respective channel frequencies within a predetermined period, before the reference time.

The controller 170 generates the switching control signal for selecting the signals to be output as the TV viewing signal, the BP data detecting signal, and the VCR recording signal according to the selection of the user.

The BP data control signal sets the time before the reference time as a BP data storing period for updating any changed BP data, and the time after the reference time as a BP data comparing period for comparing the identification code of input BP data with the identification code of BP data of the program programmed by a user to be recorded.

The BP data control signal is used to generate the recording control signal for performing the recording in the case when the BP data of the program to be recorded is input.

The recording can be performed by the TVCR after the changed BP data is updated and the BP data of the program programmed to be recorded is received. At the same time, the user may view a desired program on the TV of the TVCR.

Figure 2A:
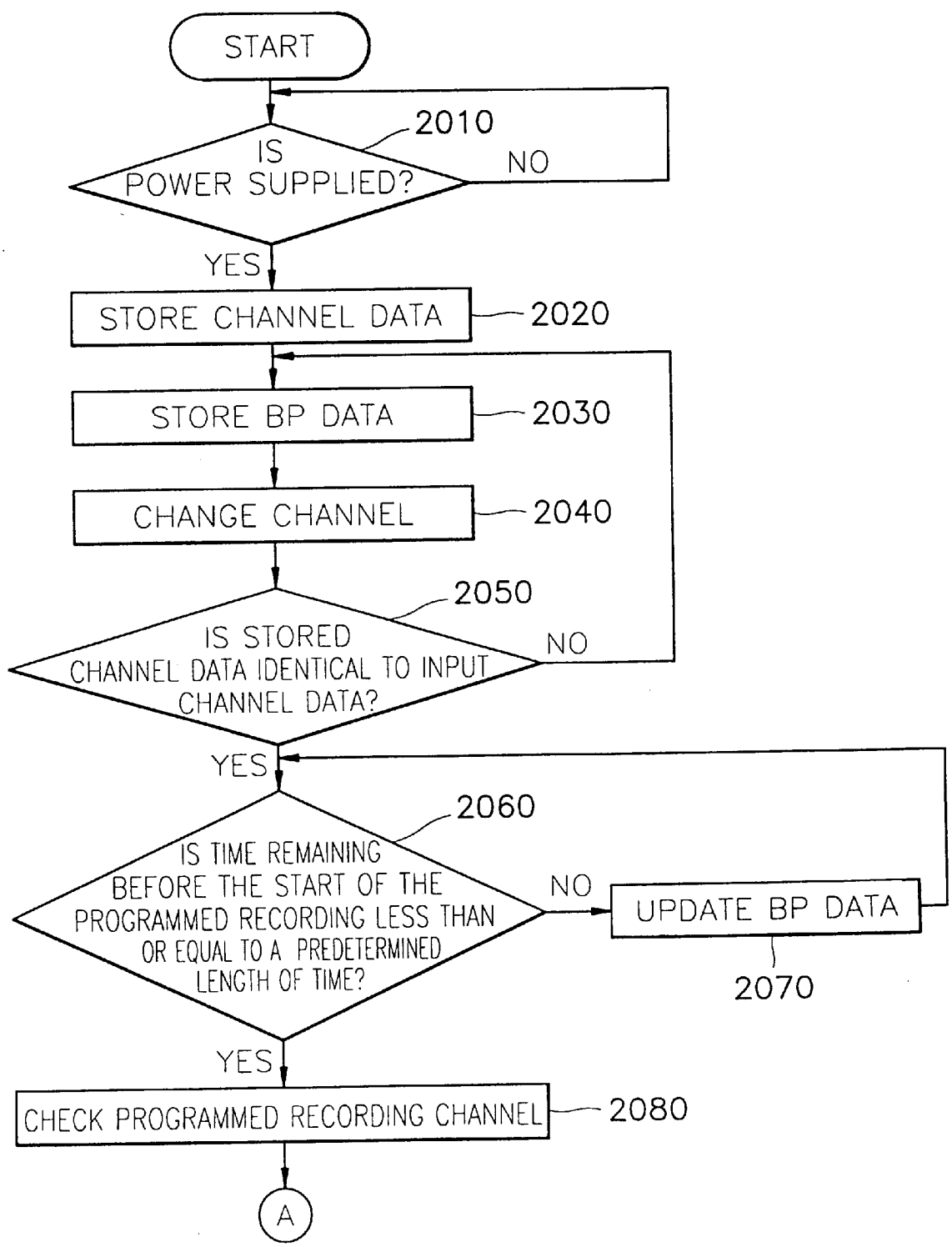
FIGS. 2A and 2B, taken together, constitute a flow chart of a method for performing a programmed recording using BP data in a two-tuner system according to the present invention.
Figure 2B:
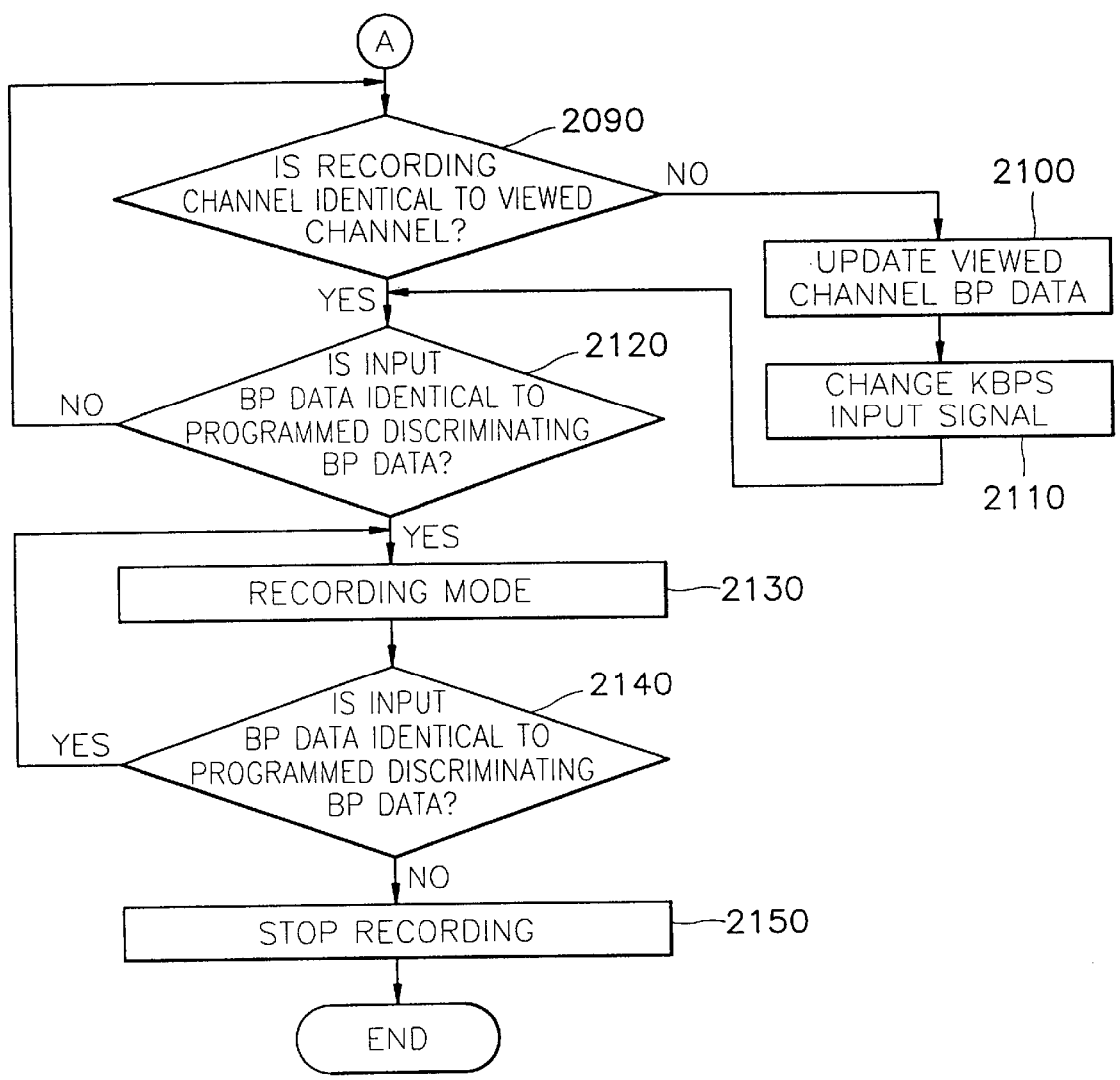

As shown in FIG. 2, the programmed recording method using the BP data in a two-tuner system of the present invention includes a power supply checking step 2010 of checking whether the power is supplied to the TVCR, a channel data storing step 2020 of storing data of the present channel, a BP data storing step 2030 of storing the BP data of the received channel in a memory, a channel changing step 2040 for incrementing or decrementing the channel, a channel data comparing step 2050 of comparing the channel data stored in the memory with the input channel data, a programmed recording time comparing step 2060 of comparing the time remaining before the start time of the programmed recording with a value set at the initial stage, a BP data updating step 2070 of updating the BP data when the BP data is changed, a programmed recording channel checking step 2080 of checking the programmed recording channel, a recording/viewing channel comparing step 2090 of comparing the programmed recording channel with the viewed channel, a periodic BP data updating step 2100 of updating the BP data of the viewed channel at a certain time period, a BP data input signal changing step 2110 of changing the KBPS input signal used when being compared with the identification code of BP data, a first identification BP data comparing step 2120 of comparing the identification code of input BP data with the identification code of BP data of the programmed recording, a recording step 2130 of performing the recording, a second identification BP data comparing step 2140 of comparing the identification code of input BP data with the identification code of BP data of the programmed recording, and a stop mode execution step 2150 of terminating the recording.

In the power supply checking step 2010, it is checked whether the power of the TVCR has been turned on. If it has, the channel data storing step 2020 is performed.

In the channel data storing step 2020, the channel data of the broadcasting signal input to the second tuner is stored in the memory.

In the BP data storing step 2030, the BP data of the present channel is stored in the memory after storing the channel data.

In the channel changing step 2040, the channel is incremented or decremented to allow the BP data of another channel to be stored in the memory after storing the BP data of the selected channel of the second tuner.

In the channel data comparing step 2050, the channel data stored in the memory, at the initial stage when the power is supplied, is compared with the changed channel. This is for terminating the storage of the BP data, after storing the BP data of all the channels having the BP data. That is, the storage of the BP data is continued while the channel data stored in the memory is not identical to the changed channel data. When the channel data stored in the memory is identical to the changed channel data, the programmed recording time comparing step 2060 is performed.

In the programmed recording time comparing step 2060, the time remaining before the start of the programmed recording is compared with a predetermined length of time set at the initial stage. This is for reducing power consumption by comparing the identification code of BP data of the program programmed to be recorded between the programmed recording starting time and the predetermined time.

When the time remaining before the programmed recording starting time is more than the predetermined time set at the initial stage, the BP data updating step 2070 is performed in which the channel of the second tuner is updated at uniform intervals and only the input BP data that has changed is newly stored.

When the time remaining before the programmed recording starting time is less than or equal to the predetermined time set at the initial stage, the programmed recording channel checking step 2080 of checking the channel programmed to be recorded is performed.

In the programmed recording channel checking step 2080, the channel data set during the BP data programming is checked.

In the recording/viewing channel comparing step 2090, the channel programmed to be recorded is compared with the viewed channel to check whether the channels are identical to each other.

When the channel to be recorded is determined not to be identical to the viewed channel in the recording/viewing channel comparing step 2090, the periodic BP data updating step 2100 for updating the changed BP data of the viewed channel is performed for a predetermined period of time.

In the BP data input signal changing step 2110, the input signal to the BP data processor is changed from the broadcast signal of the viewed channel, which is the output of the first tuner, to the broadcast signal of the recording channel, which is the output of the second tuner, in order to compare the BP data.

However, in the case when the channel to be recorded is identical to the viewed channel, the BP data of the TV viewing signal which is the output signal of the first tuner is updated and the first BP identification data comparing step 2120 is performed.

In the first identification BP data comparing step 2120, the identification code of input BP data of the channel programmed to be recorded is compared with the identification code of BP data of the program programmed to be recorded by the user.

If the two sets of identification codes of BP data are not identical, the recording/viewing channel comparing step 2090 is returned to and repeated. If the two sets of the identification code of BP data are identical, the recording step 2130 of performing the recording is performed since the program programmed to be recorded is therefore being received. During recording, the second identification BP data comparing step 2140 is performed in order to check whether the program programmed to be recorded has finished. If the input BP data is determined not to be identical to the identification code of BP data of the program programmed to be recorded by the user, as a result of the comparison in the second identification BP data comparing step 2140, it is determined that the program programmed to be recorded has finished, and the stop mode execution step 2150 of stopping the recording is performed.

It is possible to perform the recording with a TVCR after the changed BP data is updated and the BP data of the program programmed to be recorded is received, at the same time as when the user views a desired program on the TV of the TVCR.

The present invention is not restricted to the TVCR programmed recording by the BP data transmission method according to the above embodiment. The programmed recording method based on program data such as a video program system VPS can be applied within the scope and spirit of the present invention by anyone skilled in the art.

According to the present invention, it is possible to watch a TV and perform the programmed recording using the BP data at the same time by storing the BP data and checking the discriminating data of the program programmed to be recorded by using two tuners.

While only certain embodiments of the invention have been specifically described herein, it will apparent that numerous modifications may be made thereto without departing from the spirit and scope of the invention.

What is claimed is:

1. A broadcasting program (BP) data programmed recording apparatus of a TV coupled with a VCR (TVCR) having a TV receiving first tuner and a VCR recording second tuner, comprising:

a switching portion for receiving as input signals an output signal of said first tuner, an output signal of said second tuner, and an externally applied demodulated video signal, switching the input signals according to a switching control signal, and outputting a TV viewing signal, a BP data detecting signal, and a VCR recording signal;

a BP data processor for receiving said BP data detecting signal, storing BP data changed from previously stored BP data during a BP data storing period, checking whether BP data of a programmed recording is input during a BP data comparing period according to a BP data control signal, and repeating the storing of BP data that has changed from previously stored BP data while waiting until a predetermined time before a starting time of the program programmed to be recorded;

a TV signal processor for receiving said TV viewing signal, signal processing said TV viewing signal, and outputting said signal processed TV signal to a monitor;

a video recording processor for receiving said VCR recording signal and performing recording; and a controller for generating the switching control signal for determining multiple output signals by switching the input signals of said switching portion according to a selection of a user, the BP data control signal for defining the BP data comparing period and the BP data storing period, and a recording control signal for performing the recording only when a BP data set to be recorded is checked.

2. A BP data programmed recording device as claimed in claim 1, wherein the switching control signal of said controller switches said TV viewing signal and said VCR recording signal at a predetermined interval of time in the case where said TV viewing signal and said VCR recording signal are the broadcast signals of different channels of the output signals of said switching portion.

3. A BP data programmed recording device as claimed in claim 1, wherein the BP data control signal of said controller is set to compare the BP data only until a predetermined time before a starting time of the program programmed to be recorded.

4. A broadcasting program (BP) data programmed recording method of a TV coupled with a VCR (TVCR) having a TV receiving first tuner and a VCR recording second tuner, comprising:

a BP data storing step of storing the BP data of all broadcast channels which transfer BP data, when power is turned on;

a BP data storing/checking step of storing changed BP data of the broadcast signal of a received signal of a received channel, changing a channel of said second tuner at predetermined time intervals until a predetermined time before a starting time of a program programmed to be recorded, repeating the storing of BP data that has changed from previously stored BP data while waiting until a predetermined time before a starting time of the program programmed to be recorded and checking an identification code of BP data of the channel programmed to be recorded after the predetermined time before the starting time of a program programmed to be recorded, when the BP data of all the respective channels is stored; and a recording step of performing recording in the case when input BP data is determined to be identical to the identification code of BP data programmed to be recorded, as a result of performing said BP data storing/checking step.

5. A BP data programmed recording method as claimed in claim 4, wherein said BP data storing/checking step further comprises a BP updating step of comparing said channel programmed to be recorded with a viewed channel after the predetermined time before the starting time of the program programmed to be recorded, switching said channel programmed to be recorded and the viewed channel at a predetermined time in the case when the channel programmed to be recorded and the viewed channel are not identical, and storing the changed BP data of said viewed channel.

6. The broadcasting program (BP) data programmed recording apparatus according to claim 1, wherein said controller further generates a channel selection control signal for controlling a sequential selection of channels to store the BP data of all channels by changing a tuned frequency of said second tuner to respective channel frequencies at uniform time intervals until a predetermined time before a starting time of the program programmed to be recorded.

* * * * *